J. H. SOREY.
Corn Planter.

No. 38,510.

2 Sheets—Sheet 1.

Patented May 12, 1863.

J. H. SOREY.
Corn Planter.

No. 38,510.

2 Sheets—Sheet 2.

Patented May 12, 1863.

UNITED STATES PATENT OFFICE.

JAMES H. SOREY, OF XENIA, ILLINOIS.

IMPROVEMENT IN CORN-PLANTERS.

Specification forming part of Letters Patent No. 38,510, dated May 12, 1863; antedated December 28, 1861.

*To all whom it may concern:*

Be it known that I, JAMES H. SOREY, of Xenia, in the State of Illinois, have invented a new and Improved Corn-Planter; and I do hereby declare the following to be a correct description of the same, reference being had to the accompanying drawings, making part of this specification, in which—

Figure 1:
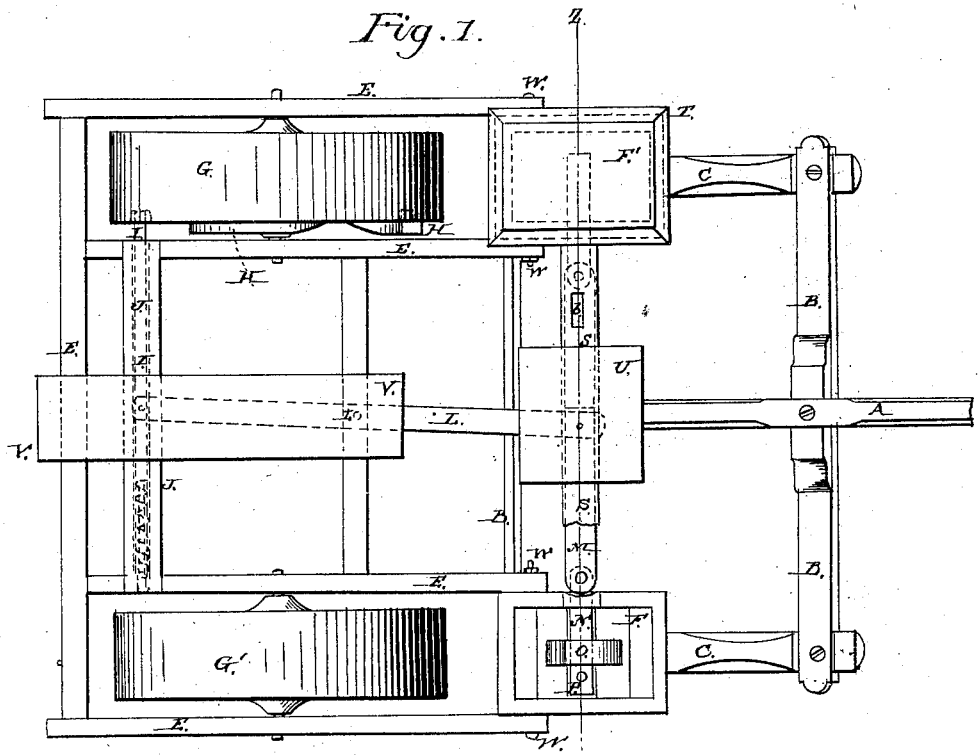
Figure 2:
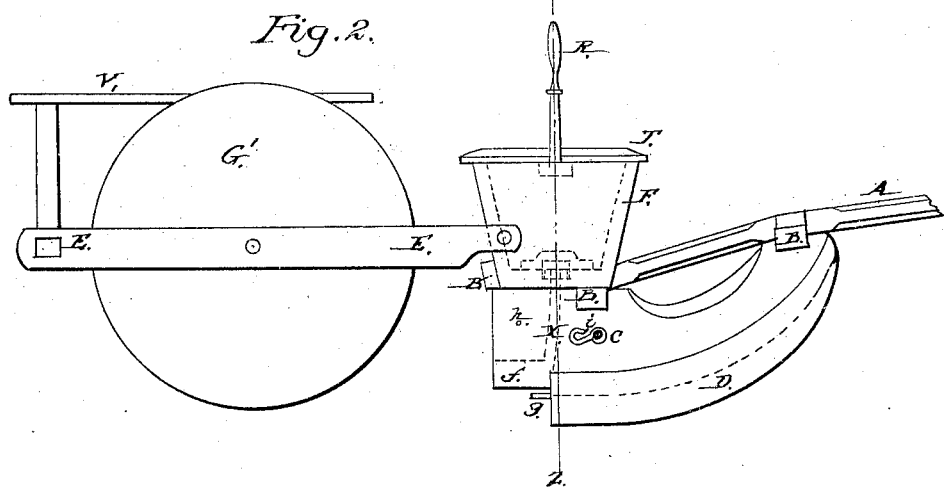
Figure 4:
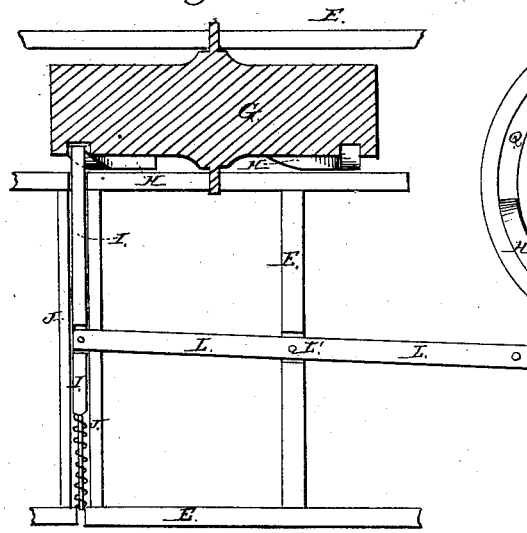
Figure 5:
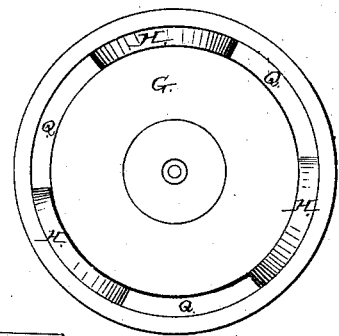
Figure 6:
Figure 7:
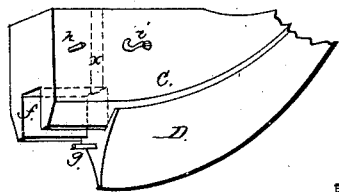
Figure 3:
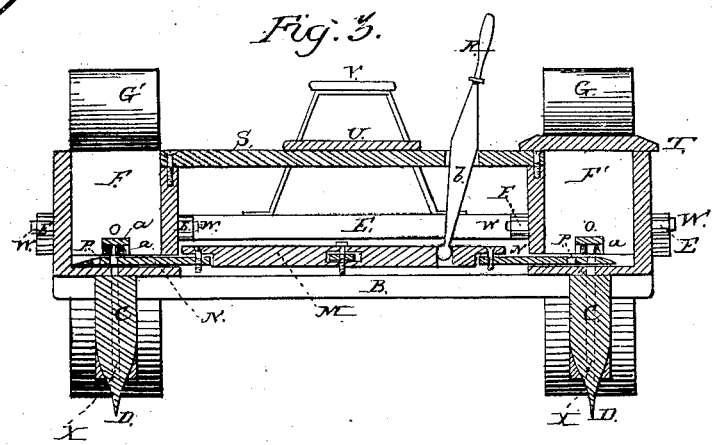

Figure 1 is a top view or plan of my improved corn-planter. Fig. 2 is a side elevation of the same. Fig. 3 is a section through line Z Z of Figs. 1 and 2. Fig. 4 is a horizontal section through the axis of the cam-wheel G. Fig. 5 is a side elevation of that wheel. Fig. 6 is a detail view of the brushes. Fig. 7 is a similar view of the runner.

The same part is marked, wherever it occurs in the drawings, by the same letter of reference.

A marks the tongue by which the implement is drawn; B, the front cross-pieces of the framing; C C, the runners, forming, with cross-pieces B, that part of the implement which I call the "sled." These runners are protected below by metallic shoes D, of the shape shown in Figs. 2, 3, and 7.

E marks the main frame. Upon the frame of the sled are placed two seed-boxes, F F', which serve as receptacles for the corn to be planted, which is delivered from the bottom of these boxes in the manner hereinafter to be described. The rear frame, E, is supported on two wheels, G G', made broad to serve as covering-rollers, and one of them, G, having a cam, H, upon its inner face, which operates the planting mechanism as the implement is drawn forward.

In contact with the face of cam H plays slide I, which moves in guide-box J, and is impelled against the face of the cam by the spiral spring K. (See Figs. 1 and 4.) The slide I is pivoted to lever L, which has its fulcrum at L' on a cross-piece of the main frame, and is pivoted at its forward end to the slide-piece M. (See Fig. 4.) Thus, by the revolution of wheel G, reciprocating motion is imparted to the slide-piece M. To the ends of the slide-piece are attached the seeding-points N, which slide in the bottom of the seeding-boxes F and F'. The boxes have each a hole in the bottom for the delivery of the corn, and the points N also have holes P P through them, (see Figs. 3 and 6,) which slide over the holes in the bottom of the seed-boxes. The points N as they vibrate pass under cleats or caps O, to the under sides of which are attached the brushes *a a*. The hole in the bottom of the seed-box communicates with a passage, X, (see Figs. 2, 3, and 7,) leading into a mortise, *f*, in the rear of runner C, which is open at bottom and rear. A pin, *g*, inserted in the rear of the runner below the passage X, serves to scatter the corn as it falls to the ground.

The seed-boxes are united by a cross-piece, S, upon which a seat, U, may be placed. Through cross-piece S is a slot, *b*, through which the lever R passes. The lower end of this lever is received in a slot in slide-piece M. The seed-boxes are covered by lids T.

On the rear framing is supported and attached a shelf, V, on which a bag of grain may be carried.

The rear part of the machine is hinged to the sled by means of bolts W, passing through the rear and lower portion of the seed-boxes. Considerable flexibility is thus secured, which allows the implement to accommodate itself to irregularities in the surface of the ground.

The wheel G is represented (see Fig. 5) as having three cams alternating with three grooves, Q. Thus one revolution of the wheel would secure three deposits of seed in the soil. This may be varied at pleasure by increasing or diminishing the number of cams on the face of the wheel.

I attach to the sides of the runners C hooks *i*, for the purpose of affording a means of attaching a small harrow in rear of the runners to cover the corn before the broad wheels pass over and press the earth about it. The pins *h* are to support the harrows upon when not in use.

The operation of the implement is as follows: As the implement is drawn forward the runners prepare and mark out a furrow for the reception of the corn. The corn is placed in the seed-boxes, which are kept filled. As the wheel G revolves it imparts lateral reciprocating motion to the slide I by means of the cams H operating against the spring K. The slide I imparts vibratory motion to lever L, which operates the front slide-piece, M, giving it a lateral reciprocating movement between the seed-boxes. The seeding-points N, being attached to slide M, move with it. They move under the brush-caps O, and just below the brushes a a, the operation of which is to prevent too much corn from passing through the points at each vibration. The holes P in the seeding-points may be larger or smaller, according to the quantity of corn per acre it is desired to plant, and the points themselves may be taken out and replaced by others at will. The corn falls into and fills the holes P, and as they are, at each vibration of the slide M, brought directly over the holes in the bottom of the seed-boxes, the corn passes down through the passage X, and falls upon the ground, being slightly scattered in its descent by coming in contact with the pin g. It is covered by the small harrow before mentioned, and rolled by the broad tread of the wheels G G'.

When it is desired to transport the machine from place to place without working the planting apparatus it is only necessary to fasten the slide I back by means of a pin or bolt, so that it will not come into contact with the cams H.

This implement is simple, cheap, and admirably adapted to the wants of the western farmer.

Having thus fully described my invention, what I claim, and desire to secure by Letters Patent, is—

The combination and arrangement of the cams H, grooves Q, slide I, spring K, lever L, slide M, and points N, constructed and operating together in the manner specified.

The above specification signed and witnessed this 15th day of September, A. D. 1860.

JAMES H. SOREY.

Witnesses:
LEVI MISENHIMER,
R. D. S. FILSON.